United States Patent
Adams et al.

(10) Patent No.: US 9,624,401 B2
(45) Date of Patent: Apr. 18, 2017

(54) PROCESS FOR PRODUCING AQUEOUS POLYURETHANE FORMULATIONS

(71) Applicant: BASF SE, Ludwigshafen (DE)

(72) Inventors: Stefan Adams, Ludwigshafen (DE); Volker Bach, Basel (CH); Karl Haeberle, Speyer (DE); Reinhard Treiber, Leimen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/767,121

(22) PCT Filed: Feb. 12, 2014

(86) PCT No.: PCT/EP2014/052686
§ 371 (c)(1),
(2) Date: Aug. 11, 2015

(87) PCT Pub. No.: WO2014/128031
PCT Pub. Date: Aug. 28, 2014

(65) Prior Publication Data
US 2015/0368511 A1 Dec. 24, 2015

(30) Foreign Application Priority Data

Feb. 22, 2013 (EP) .................................... 13156341

(51) Int. Cl.
| | |
|---|---|
| *C08G 18/08* | (2006.01) |
| *C09D 175/08* | (2006.01) |
| *C08G 18/66* | (2006.01) |
| *C08G 18/76* | (2006.01) |
| *C09D 175/04* | (2006.01) |
| *C14C 11/00* | (2006.01) |
| *C08K 5/17* | (2006.01) |

(52) U.S. Cl.
CPC ....... *C09D 175/08* (2013.01); *C08G 18/0823* (2013.01); *C08G 18/6692* (2013.01); *C08G 18/7621* (2013.01); *C08K 5/17* (2013.01); *C09D 175/04* (2013.01); *C14C 11/006* (2013.01)

(58) Field of Classification Search
CPC C09D 175/08; C09D 175/04; C08G 18/0823; C08G 18/7621; C08G 18/6692; C08K 5/17
See application file for complete search history.

(56) References Cited

U.S. PATENT DOCUMENTS

| | | | |
|---|---|---|---|
| 4,192,937 A | 3/1980 | Noll et al. | |
| 4,269,748 A | 5/1981 | Nachtkamp et al. | |
| 4,292,226 A | 9/1981 | Wenzel et al. | |
| 5,401,582 A | 3/1995 | Weyland et al. | |
| 6,084,051 A * | 7/2000 | Blum ................. | C08G 18/0866 524/840 |
| 7,342,068 B2 * | 3/2008 | Klingenberg ...... | C08G 18/0823 524/401 |
| 2012/0309890 A1 | 12/2012 | Häberle et al. | |
| 2013/0232858 A1 | 9/2013 | Strittmatter et al. | |
| 2015/0099843 A1 | 4/2015 | Hartig et al. | |
| 2015/0225336 A1 | 8/2015 | Haeberle et al. | |
| 2015/0232605 A1 | 8/2015 | Bubolz et al. | |

FOREIGN PATENT DOCUMENTS

| | | |
|---|---|---|
| DE | 27 25 589 A1 | 12/1978 |
| DE | 27 32 131 A1 | 1/1979 |
| DE | 28 11 148 A1 | 9/1979 |
| DE | 198 24 484 A1 | 12/1999 |
| EP | 0 441 196 A2 | 8/1991 |
| WO | WO 2011/121679 A1 | 10/2011 |
| WO | WO-2011121679 * 11/2011 ............. C08G 18/00 |  |

OTHER PUBLICATIONS

International Search Report issued May 9, 2014 in PCT/EP2014/052686 (with English Translation of Category of Cited Documents).

* cited by examiner

*Primary Examiner* — Michael L Leonard
(74) *Attorney, Agent, or Firm* — Oblon, McClelland, Maier & Neustadt, L.L.P.

(57) ABSTRACT

A process for producing aqueous polyurethane preparations comprises the steps of:
A) providing a solution in at least one solvent of at least one polymeric polyurethane bearing ionizable groups,
B) using at least one neutralizing agent to partially neutralize the at least one polymeric polyurethane bearing ionizable groups,
C) dispersing the at least one polymeric polyurethane bearing ionizable groups in water,
D) optionally removing the at least one solvent,
E) optionally diluting the mixture after solvent removal with further water,
F) admixing neutralizing agent after solvent removal.

10 Claims, No Drawings

PROCESS FOR PRODUCING AQUEOUS POLYURETHANE FORMULATIONS

The present invention relates to a process for producing aqueous polyurethane dispersions and to their use as adhesion primer for leather finishes, particularly on fatliquored and/or waterproofed leathers.

Dried leather after tanning, fatliquoring and/or waterproofing is finished with a protective coat in order, in particular, to protect the leather from soiling and damage, or to modify the surface properties of the leather with regard to properties such as color or gloss. The fatliquoring and/or waterproofing agents endow the leather with the desired softness and also the desired water-repellent characteristics.

One of the requirements of a leather finish is good adherence to the leather. Yet with highly fatliquored and/or waterproofed leathers in particular, the adherence of most leather-finishing systems is unsatisfactory. There is accordingly a need for leather-finishing auxiliaries which, before the actual leather finish, are applied to the fatliquored and/or waterproofed leather as an adhesion primer to confer enhanced adherence on the subsequently applied finish without, at the same time, reducing the fatliquoring and/or waterproofing effect to any significant extent.

EP 441 196 A2 discloses aqueous polyurethane dispersions obtained by providing a polymeric polyurethane in an organic solvent, neutralizing the polyurethane, dispersing the neutralized polyurethane in water and removing the organic solvent.

There are many applications, as for adhesion primers, in particular adhesion primers on leather, where it would be desirable to have polyurethane ("PU") dispersions in which the dispersed PU particles have a low average particle diameter.

A small particle size, however, frequently entails a comparatively high viscosity for the dispersion. As a result, PU dispersions in which the particles have a small average particle size are often more difficult to handle by reason of a high viscosity than PU dispersions having the same solids content and a larger particle size.

It would be desirable, however, to produce PU dispersions having high solids contents in order to minimize the resources employed for transporting and storing same.

The problem addressed by the present invention was therefore that of providing a process for producing PU dispersions which have a low particle size and which are simple to obtain from PU dispersions of high solids content.

The process for producing such PU dispersions should also be simple to carry out.

The problem was solved by a process for producing polyurethane dispersions, which comprises the steps of:
A) providing a solution in at least one solvent of at least one polymeric polyurethane bearing ionizable groups,
B) using at least one neutralizing agent to partially neutralize the at least one polymeric polyurethane bearing ionizable groups,
C) dispersing the at least one polymeric polyurethane bearing ionizable groups in water,
D) removing the at least one solvent,
E) optionally diluting the dispersion after solvent removal with further water,
F) admixing neutralizing agent after solvent removal.

Useful polymeric polyurethanes bearing ionizable groups (hereinafter also referred to as "polymeric polyurethanes" or "polyurethanes") include in principle any polymeric polyurethanes bearing ionizable groups and processable into aqueous polyurethane ("PU") dispersions. Processes for producing solutions of polyurethanes as per step A) are known per se to a person skilled in the art.

Useful polymeric polyurethanes may for instance contain or consist of the following components:
a) at least one organic diisocyanate or organic isocyanate mixture having an arithmetic mean NCO functionality of 1.9 to 2.3 [monomers I],
b) at least one dihydric polyalcohol having a number average molecular weight of 500 to 5000 or mixture of polyalcohols having a number average molecular weight of 500 to 5000 that has an arithmetic mean alcoholic OH group functionality of 1.6 to 2.3 [monomers II],
c) at least one alcohol comprising from 1 to 3 alcoholic OH groups and also at least one ionizable group [monomers III],
d) no, one or more dihydric alcohols having a number average molecular weight of 62 to 499 or a mixture of alcohols having a number average molecular weight of 62 to 499 which has an arithmetic mean alcoholic OH group functionality of 1.9 to 2.3 [monomers IV],
e) no, one or more monohydric polyether alcohols [monomers V], and
f) no, one or more polyamines having at least two —NH— groups [monomers VI].

Useful monomers I include in particular not only aliphatic and aromatic but also araliphatic diisocyanates such as tetramethylene diisocyanate, hexamethylene diisocyanate, dodeca-methylene diisocyanate, 1,4-diisocyanatocyclohexane, 4,4'-di(isocyanatocyclohexyl)methane, trimethylhexane diisocyanate, 1-isocyanato-3,3,5-trimethyl-5-isocyanatomethylcyclohexane(isophorone diisocyanate), 2,4-diisocyanatotoluene, 2,6-diisocyanatotoluene, tetramethylxylylene diisocyanate, 1,4-diisocyanatobenzene, 4,4'-diisocyanatodiphenylmethane, p-xylylene diisocyanate, and also isopropenyldimethyltolylene diisocyanate. Useful monomers I further include derivatives of these diisocyanates in the form of polyisocyanates with or without higher functionality and a carbodiimide, allophanate, isocyanurate, urethane and/or biuret group content, and also monoisocyanates such as phenyl isocyanate, cyclohexyl isocyanate, hexyl isocyanate or dodecyl isocyanate. Preference is given to using 2,4- and 2,6-diisocyanatotoluene and their mixtures, hexamethylene diisocyanate, 1-isocyanato-3,3,5-trimethyl-5-isocyanato-methylcyclohexane and also 4,4'-di(isocyanatocyclohexyl)methane. Preferably aliphatic monomers I are employed to produce products that do not yellow on exposure to light.

Useful diols (b) (monomers II) chiefly include comparatively high molecular weight diols (b) having a molecular weight of about 500 to 5000, preferably of about 1000 to 3000 g/mol.

Said diols (b) include, for example, polyester polyols as known for example from Ullmanns Enzyklopädie der technischen Chemie, 4th edition, volume 19, pages 62 to 65. Preference is given to employing polyester polyols obtained by reacting dihydric alcohols with dibasic carboxylic acids. In lieu of free polycarboxylic acids, polyester polyols are also obtainable using the corresponding polycarboxylic anhydrides or polycarboxylic esters of lower alcohols or mixtures thereof. The polycarboxylic acids in question may be aliphatic, cycloaliphatic, araliphatic, aromatic or heterocyclic and may optionally be substituted, as by halogen atoms for example, and/or unsaturated. Examples are suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, dimeric fatty acids. Preference is given to dicarboxylic acids of the general formula HOOC—(CH$_2$)$_y$—COOH, where y is from 1 to 20, preferably an even number from 2 to 20, e.g., succinic acid, adipic acid, dodecanedicarboxylic acid and sebacic acid.

Useful polyhydric alcohols include, for example, ethylene glycol, 1,2-propanediol, 1,3-propane-diol, 1,3-butanediol, 1,4-butenediol, 1,4-butynediol, 1,5-pentanediol, neopentyl glycol, bis(hydroxymethyl)cyclohexanes such as 1,4-bis(hydroxymethyl)cyclohexane, 2-methyl-1,3-propanediol, further diethylene glycol, triethylene glycol, tetraethylene glycol, polyethylene glycol, dipropylene glycol, polypropylene glycol, dibutylene glycol and polybutylene glycols. Preference is given to neopentyl glycol and also alcohols of the general formula HO—(CH$_2$)$_x$—OH, where x is from 1 to 20, preferably an even number from 2 to 20. Examples thereof are ethylene glycol, 1,4-butanediol, 1,6-hexanediol, 1,8-octanediol and 1,12-dodecanediol.

Further possibilities include polycarbonate diols as obtainable for example by reacting phosgene with an excess of the low molecular weight alcohols recited as reaction components for polyester polyols.

Also suitable are lactone-based polyester diols, these being homo- or copolymers of lactones, preferably being hydroxyl-terminated addition products of lactones onto suitable difunctional starter molecules. The lactones used are preferably derived from hydroxy carboxylic acids of the general formula HO—(CH$_2$)$_z$—COOH, where z is from 1 to 20, preferably an odd number from 3 to 19, e.g., ε-caprolactone, β-propiolactone, γ-butyrolactone and/or methyl-ε-caprolactone and also mixtures thereof. Useful starter components include, for example, the low molecular weight dihydric alcohols recited above as reaction component for polyester polyols. The corresponding chain growth addition polymers of ε-caprolactone are particularly preferable. Useful starters for preparing lactone polymers further include lower polyester diols or polyether diols. In lieu of chain growth addition polymers of lactones, it is also possible to use the corresponding, chemically equivalent polycondensates of the hydroxy carboxylic acids corresponding to the lactones.

Polyether diols are additionally useful as monomers (b). They are obtainable in particular by polymerization of ethylene oxide, propylene oxide, butylene oxide, tetrahydrofuran, styrene oxide or epichlorohydrin with itself, for example in the presence of BF$_3$, or by addition reaction of these compounds, optionally mixed or in succession, onto starter components having reactive hydrogen atoms, such as alcohols or amines, e.g., water, ethylene glycol, 1,2-propanediol, 1,3-propanediol, 2,2-bis(4-hydroxydiphenyl)propane or aniline. Particular preference is given to polytetrahydrofuran having a molecular weight of 500 to 5000 g/mol, especially 1000 to 4500 g/mol.

Polyester diols and polyether diols are also usable as mixtures in a ratio of 0.1:1 to 1:9.

Useful monomers II include, in particular, dihydric polyether alcohols of the type obtainable, for example, by polymerization of ethylene oxide, propylene oxide, butylene oxide, tetrahydrofuran, styrene oxide or epichlorohydrin with itself, for example in the presence of suitable catalysts such as boron trifluoride, or by addition reaction of these compounds, optionally mixed or in succession, onto starter components having reactive hydrogen atoms, such as amines or alcohols. Polyether diols comprising not less than 70 wt % of identical or different units of the structure

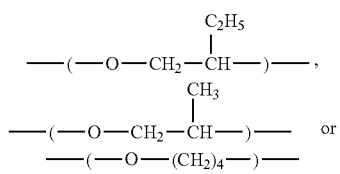

are particularly useful as monomers II.

Groups on monomers III are said to be ionogenic (ionizable) when per se or following suitable adaptation, for example by neutralization or quaternization, they form a partially or completely ionized state in an aqueous medium, yet excepting —N—H— groups. This adaptation may in general be effected before, during and/or after the formation of the polymeric polyurethane. The adaptation preferably takes place after the formation of the polymeric polyurethane. Examples of ionogenic groups are acid functions such as carboxyl or sulfonic acid groups, which are adaptable by neutralization with bases, or tertiary amines, which are quaternizable or can be converted into ammonium ions by admixture of an acid. Ionogenic groups are suitably adaptable by neutralization using organic or inorganic bases such as alkali metal hydroxides, alkali metal carbonates, alkali metal bicarbonates, ammonia or primary, secondary and also, preferably, tertiary amines, for example triethylamine, dimethylaminoethanol or dimethylamino-propanol, and also organic or inorganic acids such as hydrochloric acid, acetic acid, fumaric acid, maleic acid, lactic acid, tartaric acid, oxalic acid or phosphoric acid. Useful quaternizing agents include methyl iodide, methyl chloride, dimethyl sulfate, benzyl chloride, ethyl chloroacetate or bromoacetamide.

Preference for use as monomers III is given to dihydroxy carboxylic or sulfonic acids comprising from 4 to 10 carbon atoms, N-alkyldialkanolamines such as N-methyldiethanolamine or N-ethyldiethanolamine. Particular preference is given to dihydroxy carboxylic acids comprising from 5 to 10 carbon atoms and having the general formula

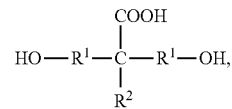

where R$^1$ is alkylene and R$^2$ is alkyl, in particular dimethylolpropionic acid.

From 0.1 to 1.2 mmol of the ionogenic groups on monomers III incorporated in the polymeric polyurethanes employed according to the present invention are advantageously in ionized form per gram of polymeric polyurethane in the aqueous preparation.

Useful monomers IV include 1,2-ethanediol, 1,2-propanediol, butanediols, 1,4-butenediol, 1,4-butynediol, pentanediol, hexanediols, octanediols, 1,4-bishydroxymethylcyclohexane, 2,2-bis(4-hydroxycyclohexyl)propane, 2-methyl-1,3-propanediol, glycerol, trimethylolpropane, 1,2,6-hexanetriol, 1,2,4-butanetriol, pentaerythritol, sorbitol, diethylene glycol, triethylene glycol, tetraethylene glycol, dipropylene glycol and also dibutylene glycol.

Monomers V, if used at all, are preferably used in the form of monohydric polyether alcohols having a number average molecular weight M$_n$ in the range from 500 to 10 000, preferably from 1000 to 5000. They are obtainable for example by alkoxylation of monohydric alkanols such as methanol, ethanol or n-butanol using, for example ethylene oxide or propylene oxide as alkoxylating agent. The degree of ethoxylation of monomers V is preferably more than 60 wt %.

Monomers VI preferably have a molecular weight of 32 to 500. Examples of useful monomers VI are diamines such as 1,2-diaminoethane, 1,6-diaminohexane, piperazine, 2,5-dimethylpiperazine, 1-amino-3-aminomethyl-3,5,5-trimethylcyclohexane(isophoronediamine), 4,4'-di(aminocyclohexyl)methane, 1,4-diaminocyclohexane, 1,2- and 1,3-diaminopropane, hydrazine, hydrazine hydrate, triamines such as diethylenetriamine or tetramines such as N,N'-bis(3-aminopropyl)-1,4-diaminobutane. Useful monomers VI further include ketimines as described in DE-B-27 25 589, ketazines as described in DE-B-28 11 148 and U.S. Pat. No. 4,269,748, amine salts as described in U.S. Pat. No. 4,292,226 or oxazolidines as described in DE-B-27 32 131 and U.S. Pat. No. 4,192,937. These are capped polyamines whence the corresponding polyamines are liberated as intermediates in the presence of water. Useful monomers VI also include in particular polyamines bearing one or more alcoholic hydroxyl groups. The polymeric polyurethanes employed according to the present invention preferably do not contain any incorporated monomer VI.

Further examples of monomers I to VI useful for forming the polymeric polyurethanes are described for example in High Polymers, Vol. XVI, "Polyurethanes, Chemistry and Technology", Interscience Publishers, New York, Vol. 1, 1962, pages 32 to 42, pages 44 to 54 and Vol. II, 1964, pages 5 to 6 and pages 198 to 199.

The polymeric polyurethanes employed according to the present invention preferably incorporate only those monomers I to IV that have two isocyanate groups or two alcoholic OH groups. The amounts of incorporated monomers I to VI are advantageously determined such that the NCO/(OH+—N—H) equivalent ratio for the incorporated monomers I, the OH groups of incorporated monomers II to V and also the —N—H groups of incorporated monomers VI is in the range from 0.95 to 1.0.

In one preferred embodiment of the invention, the amounts of incorporated monomers I to VI are determined such that the OH/NCO equivalent ratios for incorporated
monomers II/monomers I is from 0.2 to 0.6
monomers III/monomers I is from 0.2 to 0.8
monomers IV/monomers I is from 0 to 0.2 and
monomers V/monomers I is from 0 to 0.2
and the N.H/NCO equivalent ratio of incorporated monomers VI/monomers I is from 0 to 0.1,
that the arithmetic mean functionality of total incorporated monomers I to V, averaged across the sum total of NCO groups on monomers I and the alcoholic OH groups on monomers II to V, is from 1.8 to 2.3, that the NCO/(OH+—NH) equivalent ratio for incorporated monomers I, the OH groups of incorporated monomers II to V and also the —N—H groups of incorporated monomers VI is from 0.9 to 1.0 and in the case of the co-incorporation of monomers VI at the same time the NCO/OH equivalent ratio for incorporated monomers I and the sum total of incorporated monomers II to V is greater than 1, that monomers II have a degree of ethoxylation of less than 30 wt %, that monomers V have a degree of ethoxylation of at least 40 wt % and that, per gram of polymeric polyurethane in the aqueous preparation, from 0.05 to 2 mmol of the ionogenic groups on incorporated monomers III are in ionized form.

Preferred solvents fully dissolve the polymeric polyurethanes used. Useful solvents include, for example, acetone, butanone, tetrahydrofuran, N-methylpyrrolidone or N-ethylpyrrolidone. The polymeric polyurethane is generally prepared in the absence of water.

In one preferred embodiment, the solvent is removed by distillation in a later step D) after dispersal of the polymeric polyurethane in water. One preferred embodiment, therefore, utilizes solvents having a boiling point below that of water.

Preferred solvents are acetone, tetrahydrofluran and butanone. Acetone is particularly preferred.

Components a) to f) and also their respective molar quantities are generally chosen such that the NCO:RG ratio where
NCO is the molar amount of isocyanate groups, and
RG is the sum total from the molar amount of functional groups capable of reacting with isocyanates in an addition reaction
is from 1:1 to 3:1, preferably from 1.05:1 to 2:1 and more preferably from 1.1:1 to 1.5:1.

In one preferred embodiment, the NCO:RG ratio is as close as possible to 1:1.

The polyaddition of components a) to f) is generally carried out at reaction temperatures of 20 to 180° C., preferably 40 to 150° C., more preferably 50 to 100° C. under atmospheric pressure or a pressure up to 10 bar.

The reaction times needed can range from a few minutes to several hours. It is common general knowledge in the field of polyurethane chemistry how the reaction time is influenced by various parameters such as temperature, concentration of monomers, reactivity of monomers or presence of catalysts.

The reaction of the diisocyanates may be catalyzed using the customary catalysts. Any catalysts typically used in polyurethane chemistry are suitable for this in principle.

These include, for example, organic amines, in particular tertiary aliphatic, cycloaliphatic or aromatic amines, and/or organometallic Lewis acids. Useful organometallic Lewis acids include, for example, tin compounds, for example tin(II) salts of organic carboxylic acids, e.g., tin(II) acetate, tin(II) octoate, tin(II) ethylhexoate and tin(II) laurate, and the dialkyltin(IV) salts of organic carboxylic acids, e.g., dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. Similarly, metal complexes such as acetylacetonates of iron, of titanium, of aluminum, of zirconium, of manganese, of nickel and of cobalt are possible. Further metallic catalysts are described by Blank et al. in Progress in Organic Coatings, 1999, Vol. 35, pages 19-29.

Preferred organometallic Lewis acids are dimethyltin diacetate, dibutyltin dibutyrate, dibutyltin bis(2-ethylhexanoate), dibutyltin dilaurate, dioctyltin dilaurate, zirconium acetylacetonate and zirconium 2,2,6,6-tetramethyl-3,5-heptanedionate.

Similarly, bismuth and cobalt catalysts and also cesium salts are useful as catalysts. Useful cesium salts include compounds with the following anions: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-1}O_2)^-$, $(C_nH_{2n-3}O_2)^-$ and also $(C_{n+1}H_{2n-2}O_4)^{2-}$, where n is from 1 to 20.

Preference is given to cesium carboxylates where the anion conforms to the formulae $(C_nH_{2n-1}O_2)^-$ and also $(C_{n+1}H_{2n-2}O_4)^{2-}$, where n is from 1 to 20. The anions in particularly preferred cesium salts are monocarboxylates of the general formula $(C_nH_{2n-1}O_2)^-$, where n is from 1 to 20.

Formate, acetate, propionate, hexanoate and 2-ethylhexanoate must be mentioned here in particular.

Stirred tanks make for useful polymerization apparatus, in particular when the use of solvents ensures low viscosity and efficient removal of heat.

The polymeric polyurethane prepared and/or used in step A) comprises in general up to 10 wt %, preferably up to 5 wt % and more preferably up to 2 wt % of unreacted NCO groups. In one embodiment, the polymeric polyurethane prepared and/or used in step A) comprises up to 1 wt % or up to 0.5 wt % of unreacted NCO groups.

Dissolved polymeric polyurethanes provided as per step A) bear ionizable groups. Suitable ionizable groups include, for example, those present in monomer III, for example acid functions such as carboxyl or sulfonic acid groups which, by neutralization with bases, are additionally adaptable, or tertiary amines.

Carboxyl or sulfonic acid groups are preferred ionizable groups.

According to the present invention, the ionizable groups present in the polymeric polyurethane are partially neutralized. In general, from 1 to 99 mol % of the ionizable groups in the polymeric polyurethane are neutralized. Preferably from 5 to 95 mol %, more preferably from 10 to 85 mol %, yet more preferably from 20 to 70 mol % and yet still more preferably from 30 to 60 mol % of the ionizable groups in the polymeric polyurethane are neutralized.

Acidic ionizable groups such as carboxyl or sulfonic acid groups are generally neutralized with basic neutralizing agents.

Useful basic neutralizing agents include, for example, organic or inorganic bases. Useful inorganic bases include, for example, alkali metal hydroxides such as sodium hydroxide, alkali metal carbonates such as sodium carbonate, alkali metal bicarbonates such as sodium bicarbonates or ammonia.

Preferred bases are organic bases. Preferred organic bases are primary or secondary and also, more preferably, tertiary amines, for example triethylamine, dimethylaminoethanol or dimethyl-aminopropanol. Triethylamine is especially preferred.

It is also possible to use mixtures of bases.

Basic ionizable groups are neutralized, and hence ionized, by acidic neutralizing agents, for example.

Useful acidic neutralizing agents include, for example, organic or inorganic acids such as hydrochloric acid, acetic acid, fumaric acid, maleic acid, lactic acid, tartaric acid, oxalic acid or phosphoric acid.

Tertiary amino groups may be quaternized with suitable quaternizing agents, for example. This is likewise referred to as neutralization herein.

Useful quaternizing agents include, for example, methyl iodide, methyl chloride, dimethyl sulfate, benzyl chloride, ethyl chloroacetate or bromoacetamide.

Following the step of providing the polymeric polyurethane, the polymeric polyurethane is dispersed in water during or after the step of partial neutralization. This dispersal in water is effected in a conventional manner, by adding water and commixing the mixture, for example with suitable stirrers.

One possibility for example is to add a partially neutralized polymeric polyurethane to water.

Another possibility is to add a non- or partially neutralized polymeric polyurethane to water comprising a neutralizing agent.

In a less preferred embodiment of the invention, the at least one solvent remains in the PU dispersion.

In one preferred embodiment, the step of dispersing the polymeric polyurethane is followed by removing the at least one solvent used from the PU dispersion. This is generally done by distillation.

The PU dispersions thus obtained preferably have a relatively high solids content. The solids content of the PU dispersions thus obtained is preferably in the range from 10 to 60 wt %, more preferably in the range from 20 to 50 wt % and yet more preferably in the range from 25 to 40 wt %.

The polymeric polyurethanes in the preparations generally have a K value of 20 to 60 in N,N-dimethylformamide (DMF). The K value is a relative viscosity number determined similarly to DIN 53 726 at 25° C. It comprises the flow rate of a 1 wt % solution of the polyurethane in DMF, relative to the flow rate of pure DMF, and characterizes the average molecular weight of the polyurethane.

In one preferred embodiment, the PU dispersions thus obtained are diluted with further water before admixture of further neutralizing agent. The dilution with further water in step E) may in principle take place at any time following the dispersal of the polymeric polyurethane in water as per step C). Step E) is preferably carried out between steps C) and F).

In a preferred embodiment of the process according to the present invention, the PU dispersion is made with a high solids content, optionally stored and transported to the site of use in that form and only diluted as per step E) shortly before use. The interval between steps C) and E) and also between E) and F) and also the use of the PU dispersion is not critical. In one embodiment of the invention, step E) is carried out shortly before the use of the PU dispersion obtained according to the process of the present invention. Step E) may be carried out for example up to one hour, three hours, six hours, 10 hours or 24 hours before use of the PU dispersion obtained according to the process of the present invention. It is similarly possible to carry out step E) up to two days, three days, four days or one week before use of the PU dispersion obtained according to the process of the present invention. In another embodiment, step E) is carried out up to two weeks, three weeks, four weeks or one month before use of the PU dispersion obtained according to the process of the present invention. In another embodiment, step E) is carried out up to two months, three months, four months or a year or two years before the use of the PU dispersion obtained according to the process of the present invention.

In the present invention, further neutralizing agent is admixed to the PU dispersion obtained in steps A) to E). Useful neutralizing agents include in principle the same as for step B). Step F) may use the same at least one neutralizing agent as step B). It is likewise possible to use at least one different neutralizing agent in step F) than in step B).

It is preferable to use sodium hydroxide, ammonia or triethylamine in step F).

In one preferred embodiment, triethylamine is used as base in steps B) and F).

Another embodiment utilizes triethylamine as base in step B) and ammonia in step F).

Another embodiment utilizes triethylamine as base in step B) and sodium hydroxide in step F).

In general, sufficient neutralizing agent is admixed in step F) to neutralize not less than 50% of the ionizable groups present in the polymeric polyurethane. The percentage of ionizable groups in the polymeric polyurethane which are in ionic form following step F) is preferably not less than 60%, more preferably not less than 70 and yet more preferably not less than 80%.

In one embodiment of the invention, sufficient neutralizing agent is admixed in step F) for all the ionizable groups present in the polymeric polyurethane to be in ionic form.

The process of the present invention is preferably carried out by performing steps C) to F) in the order stated above. In one embodiment, steps A) to F) are carried out in the stated order.

The process of the present invention makes it possible to convert high-solids PU dispersions (PU preparations) having a comparatively large particle size at any time into PU dispersions having a smaller particle size.

For instance, PU dispersions can be produced with a high solids content, optionally stored and, for example, transported to their destination. On site, the PU dispersion can then be diluted and by admixture of further neutralizing agent converted into a PU dispersion having a smaller particle diameter.

For instance, a PU dispersion having an average particle diameter (number average as determined by dynamic light scattering) of 50 to 200 nm and a solids content of 25 to 40 wt % is convertible into a PU dispersion having an average particle diameter of 5 to 45 nm and a solids content of 10 to 24 wt %. It is in effect possible to maintain the viscosity in a range that is particularly suitable for further processing, for example from 5 to 200 mPas (rotary viscometry determined as in the examples herein).

A further property of the process according to the invention is that it is very simple to carry out. Conventional processes for producing PU dispersions have the disadvantage that they exhibit a pronounced tendency to foam during production, in particular during the distillative removal of individual components such as solvents such as acetone, butanone or tetrahydrofuran. The frequent consequence of this is a reduced space-time yield for the apparatus used or the need to add defoamer additives to the PU dispersion.

It very surprisingly transpired that the process according to the present invention has a very low tendency to foam. As a result, usage of defoamers can be much reduced or eschewed entirely. Moreover, the space-time yield of the apparatus used improves over the prior art.

PU dispersions obtained by the process according to the present invention are useful, for example, as adhesion primer for commercially available finishes on fatliquored and/or waterproofed leathers. Remarkably, the effect of the fatliquoring and/or waterproofing is not significantly diminished in this use. There is no need to use low molecular weight additives. The aqueous preparations of the present invention are conveniently applied to leather at a solids content of 1 to 20 wt %.

Application may be effected in a manner known per se, by swabbing, pouring, spraying or printing. The adhesion primer is then generally dried at temperatures of 60 to 80° C. Application rate is typically from 1 to 15 g of dry matter per square meter. After the adhesion primer, the finish is applied in a manner known per se. The finish generally consists of two or more layers and is typically applied in accordance with the dictats of fashion, by staining with pigments and/or soluble dyes. These colored constituents aside, the preparations for the finish generally comprise binders, for example on the basis of polymer solutions or dispersions, and also auxiliaries such as plasticizers or hardeners, gloss-enhancing or delustering additives, hand improvers, plating auxiliaries or flow control agents. The construction of a finish frequently parses into one or more finish basecoats and also one or more subsequent topcoats (seasoning). Application of the individual layers is generally followed by drying with or without plating.

As an alternative to the procedure described, the leather can also be finished by applying the adhesion primer preparation to the leather not by itself but together with the preparation for the first finish basecoat.

EXAMPLES

Measurements

NCO contents were determined volumetrically to DIN-EN ISO 11909.

Solids contents were determined to DIN-EN ISO 3251.

Particle sizes were determined by dynamic light scattering in a Malvern Zetasizer APS.

Reported viscosities were determined by rotary viscometry to DIN 53019 at 23° C. at 500/s using a rotary viscometer from Anton Paar Germany GmbH, Ostfildern, DE.

Abbreviations

DBTL dibutyltin dilaurate

DMPA dimethyloipropionic acid

Lupranol 1000 polypropylene oxide of molecular weight 2000 g/mol

TDI tolylene diisocyanate, 20% 2,6-isomer, 80% 2,4-isomer

TEA triethylamine

Comparative Example 1

A mixture of 87.1 g (0.50 mol) of TDI, 400 g (0.20 mol) of Lupranol 1000, 40.2 g (0.30 mol) of DMPA and 0.2 g of DBTL was reacted at 95° C. for 5.5 hours. This was followed by cooling to 30° C. and determination of the NCO group content, which was found to be 0.26 wt %, based on the reaction mixture. The reaction mixture was then diluted with 400 g of acetone and admixed with 29.1 g (0.29 mol, corresponds to 96 mol %, based on DMPA) of TEA and also with 1750 g of water by stirring.

To distill the acetone-containing dispersion, the temperature was raised to 50° C. and the pressure gradually reduced to 100 mbar.

The distillation could not be carried out because of severe foaming, requiring the addition of 5 drops of Silicone Antifoam defoamer from Aldrich. Thereafter, the distillation could be carried out within 1.5 hours.

This gave 2380 g of a finely divided PUD having a solids content of 23.4 wt %.

Example 2

A mixture of 87.1 g (0.50 mol) of TDI, 400 g (0.20 mol) of Lupranol 1000, 40.2 g (0.30 mol) of DMPA and 0.2 g of DBTL was reacted at 95° C. for 5.5 hours. This was followed by cooling to 30° C. and determination of the NCO group content, which was found to be 0.26 wt %, based on the reaction mixture. The reaction mixture was then diluted with 400 g of acetone and admixed with 12.1 g (0.12 mol, corresponds to 40 mol %, based on DMPA) of TEA and also with 1250 g of water by stirring.

To distill the acetone-containing dispersion, the temperature was raised to 50° C. and the pressure gradually reduced to 100 mbar.

This gave 1730 g of a finely divided PUD having a solids content of 31.2 wt %.

Only minimal foaming occurred during the distillation, the distillation could be carried out within 1.5 hours. There was no need to use defoamers.

The distilled dispersion was admixed with 17.7 g (0.17 mol, corresponds to 56.6 mol %, based on DMPA). The TEA overall content was accordingly 29.8 g (0.29 mol, corresponds to 96 mol % based on DMPA).

This gave 2440 g of a finely divided PUD having a solids content of 22.8 wt %.

|  | Comparative example 1 | Example 2 |
|---|---|---|
| solids content after addition of TEA (wt %) | 23.4 | |
| particle size after addition of TEA (nm) | 17.3 | |
| viscosity after addition of TEA (mPas at 500/s, 25° C.) | 56 | |
| solids content after first addition of TEA (wt %) | | 31.2 |
| particle size after first addition of TEA (nm) | | 110 |
| viscosity after first addition of TEA (mPas at 500/s, 23° C.) | | 11 |
| solids content after second addition of TEA (wt %) | | 22.8 |
| particle size after second addition of TEA (nm) | | 13.5 |
| viscosity after second addition of TEA (mPas at 500/s, 23° C.) | | 43 |

The example shows that, by virtue of the process according to the present invention, only 73% of the mass has to be transported and stored following the first neutralization than is obtained according to the comparative example. The second neutralization gives a product which is fully and entirely equivalent to that obtained according to the prior art.

The reactor has an improved space yield in processes according to the present invention, and the use of defoamer can be eschewed.

What is claimed is:

1. A process for producing an aqueous polyurethane preparation, which comprises
   B) partially neutralizing with at least one neutralizing agent an at least one polymeric polyurethane bearing ionizable groups present in a solution comprising at least one solvent, such that from 1 to 60 mol % of the ionizable groups present in the polymeric polyurethane are neutralized,
   C) dispersing the partially neutralized at least one polymeric polyurethane bearing ionizable groups in water,
   D) optionally removing the at least one solvent,
   E) optionally diluting the dispersion after solvent removal, whether or not carried out, with further water,
   F) admixing further neutralizing agent after solvent removal, whether or not carried out, to the dispersion to neutralize additional ionizable groups.

2. The process according to claim 1 wherein said C) to F) are carried out in the stated order.

3. The process according to claim 1 wherein the at least one ionizable group is a carboxyl group or is a sulfonic acid group.

4. The process according to claim 1 wherein the polymeric polyurethane comprises at least one polyol bearing carboxyl groups.

5. The process according to claim 1 wherein the at least one neutralizing agent is an organic base.

6. The process according to claim 1 wherein the at least one neutralizing agent is an amine.

7. The process according to claim 1 wherein the at least one neutralizing agent is triethylamine.

8. The process according to claim 1 wherein the solvent comprises acetone.

9. A method for manufacturing leather comprising applying a polyurethane dispersion obtained according to claim 1 to the leather.

10. The method according to claim 9 wherein the dispersion is applied in adhesion primer amounts.

* * * * *